(12) United States Patent
Ankor et al.

(10) Patent No.: US 12,026,808 B2
(45) Date of Patent: Jul. 2, 2024

(54) COLOR RENDERING SYSTEM AND METHOD

(71) Applicant: ELBIT SYSTEMS ELECTRO-OPTICS ELOP LTD, Rehovot (IL)

(72) Inventors: Uriel Ankor, Rehovot (IL); Michael Gilichinsky, Rehovot (IL)

(73) Assignee: ELBIT SYSTEMS ELECTRO-OPTICS—ELOP LTD., Rehovot (IL)

( * ) Notice: Subject to any disclaimer, the term of this patent is extended or adjusted under 35 U.S.C. 154(b) by 0 days.

(21) Appl. No.: 18/391,704

(22) Filed: Dec. 21, 2023

(65) Prior Publication Data

US 2024/0119644 A1 Apr. 11, 2024

Related U.S. Application Data

(63) Continuation of application No. PCT/IL2022/050629, filed on Jun. 13, 2022.

(30) Foreign Application Priority Data

Jun. 24, 2021 (IL) .......................... 284376

(51) Int. Cl.
G06T 11/00 (2006.01)
G06V 20/10 (2022.01)
H04N 23/10 (2023.01)

(52) U.S. Cl.
CPC .......... *G06T 11/001* (2013.01); *G06V 20/194* (2022.01); *H04N 23/10* (2023.01)

(58) Field of Classification Search
CPC ..... G06T 11/001; G06V 20/194; H04N 23/10
See application file for complete search history.

(56) References Cited

U.S. PATENT DOCUMENTS

| 8,836,793 B1 | 9/2014 | Kriesel et al. |
| 9,342,760 B1 | 5/2016 | Deskevich et al. |
| 2014/0139643 A1 | 5/2014 | Hogasten et al. |
| 2015/0358560 A1 | 12/2015 | Boulanger et al. |
| 2018/0061004 A1 | 3/2018 | Robles-Kelly |

FOREIGN PATENT DOCUMENTS

WO 2018164942 A1 9/2018

OTHER PUBLICATIONS

Toet, A., Sep. 2003, Color the Night: Applying Daytime Colors to Nighttime Imagery. In Enhanced and Synthetic Vision 2003 (vol. 5081, pp. 168-178). International Society for Optics and Photonics.
(Continued)

*Primary Examiner* — Jeffery A Brier
(74) *Attorney, Agent, or Firm* — Avi Avraham Jencmen

(57) ABSTRACT

The presently disclosed subject matter aims to a system and method directed to artificially color images acquired from image acquisition channels, cameras, imaging systems (such as, multispectral image acquisition systems, hyperspectral image acquisition systems, etc.) and the like, and present them as pseudo-Red, Green, and Blue (RGB) images to a user.

20 Claims, 4 Drawing Sheets

(56) References Cited

OTHER PUBLICATIONS

Hogervorst, M.A. and Toet, A., Mar. 2008, Method for Applying Daytime Colors to Nighttime Imagery in Realtime. In Multisensor, Multisource Information Fusion: Architectures, Algorithms, and Applications 2008 (vol. 6974, p. 697403). International Society for Optics and Photonics.
Toet, A., Hogervorst, M.A., Dijk, J. and van Son, R., May 2010, INVIS: Integrated Night Vision Surveillance and Observation System. In Enhanced and Synthetic Vision 2010 (vol. 7689, p. 768906). International Society for Optics and Photonics.
Zheng, Y., Hansen, B.C., Haun, A.M. and Essock, E.A., Jan. 2005, Coloring Night-Vision Imagery With Statistical Properties of Natural Colors by Using Image Segmentation and Histogram Matching. In Color Imaging X: Processing, Hardcopy, and Applications (vol. 5667, pp. 107-117). International Society for Optics and Photonics.
Qian, X., Han, L., Wang, Y. and Wang, B., 2013. Color Contrast Enhancement for Color Night Vision Based on Color Mapping. Infrared Physics & Technology, 57, pp. 36-41.

300

302
obtain one or more image sets, acquired by one or more imaging systems, wherein: (a) each image set comprising a plurality of images of a scene having an overlapping portion, and (b) each of the images is associated with a distinct wavelength range 304
identify, within each image set: (A) a first image within the respective image set, being: (a) a high radiance image of the respective image set having a radiance level higher than a radiance level of a first percentage of the other images of the respective image set, other than the high radiance image, or (b) a highly differentiating image of the respective image set, having a contrast between a target spectral signature and a background spectral signature higher than a contrast of a second percentage of the other images of the respective image set, other than the highly differentiating image; (B) a second image within the respective image set, being a low radiance image of the respective image set having a radiance level lower than the radiance level of a third percentage of the other images of the respective image set, other than low radiance image; and (C) a third image within the respective image set, being: (a) the low radiance image, (b) another low radiance image of the respective image set having a radiance level lower than the radiance level of a fourth percentage of the other images of the respective image set, other than the low radiance image and other then the another low radiance image, or (c) a mid-range image of the respective image set having a wavelength range that is between a first wavelength range of the first image and a second wavelength range of the second image;

306
generate a colored image of the overlapping portion wherein each pixel of the colored image has: (a) a green value associated with the radiance level of a first corresponding pixel of the first image, (b) a blue value associated with the radiance level of a second corresponding pixel of the second image, and (c) a red value associated with the radiance level of a third corresponding pixel of the third image.

FIG. 4

COLOR RENDERING SYSTEM AND METHOD

TECHNICAL FIELD

The present invention relates to the field of color rendering in multi spectral or hyperspectral systems.

BACKGROUND

Visible and Non-visible imaging involves capturing multiple images of a given scene at multiple wavelengths across various parts of the electromagnetic spectrum.

Current non-visible spectrum imagery systems utilize monochrome images (such as gray or green level images) to display the observed scene to a user, while other solutions, directed at artificiality coloring (or false coloring) of the non-visible spectrum images, are based on analysis of pixel groups within the image and association of these groups to specific colors (for example, a group of pixels that is analyzed to be foliage is artificially associated with the green color).

These prior art solutions and systems are inadequate as they fail to improve the scene realization dramatically, and as such, fail to improve the user grasp and orientate within the captured scene. Specifically, prior art solutions fail to assist a user in differentiating between a given target and its background within the observed scene.

In light of the above, there is a need in the art for a new color rendering system and method.

GENERAL DESCRIPTION

In accordance with a first aspect of the presently disclosed subject matter, there is provided a color rendering system, the color rendering system comprising a processing circuitry configured to: obtain one or more image sets, acquired by one or more imaging systems, wherein: (a) each image set comprising a plurality of images of a scene having an overlapping portion, and (b) each of the plurality of images is associated with a distinct wavelength range, wherein the wavelength range of at least one of the plurality of images within at least one of the one or more image sets is within a non-visible wavelength range; identify, within each image set: (A) a first image within the respective image set, being: (a) a high radiance image of the respective image set having a radiance level higher than a radiance level of a first percentage of the other images of the respective image set, other than the high radiance image, or (b) a highly differentiating image of the respective image set, having a contrast between a target spectral signature and a background spectral signature higher than a the contrast of a second percentage of the other images of the respective image set, other than the highly differentiating image; (B) a second image within the respective image set, being a low radiance image of the respective image set having a radiance level lower than the radiance level of a third percentage of the other images of the respective image set, other than the low radiance image; and, (C) a third image within the respective image set, being: (a) the low radiance image, (b) another low radiance image of the respective image set having a radiance level lower than the radiance level of a fourth percentage of the other images of the respective image set, other than the low radiance image and other then the another low radiance image, or (c) a mid-range image of the respective image set having a wavelength range that is between a first wavelength range of the first image and a second wavelength range of the second image; and, generate a colored image of the overlapping portion wherein each pixel of the colored image has: (a) a green value associated with the radiance level of a first corresponding pixel of the first image, (b) a blue value associated with the radiance level of a second corresponding pixel of the second image, and (c) a red value associated with the radiance level of a third corresponding pixel of the third image.

In some cases, at least one of the one or more imaging systems is: a multi-spectral imaging system or a hyperspectral imaging system.

In some cases, the wavelength range of at least one of the plurality of images within at least one of the one or more image sets is within a non-visible wavelength range.

In some cases, at least one of the one or more imaging systems is capable of acquiring images in multiple image acquisition channels, and wherein at least one of the images within each of the one or more image sets is a combination of source images acquired in two or more image acquisition channels.

In some cases, the radiance levels of the source images differ by up to a threshold.

In some cases, the radiance level of at least one of the plurality of images within at least one of the one or more image sets is normalized to be within a given radiance level value range.

In some cases, the radiance level of at least one of the plurality of images within at least one of the one or more image sets is normalized to be within a given sampling-rate value range.

In some cases, the radiance level of a given image within the respective image set is one of: (a) a first average between radiance levels of pixels of at least part of the given image, (b) a second average between radiance levels of pixels within one or more area of interest within the given image, or (c) a contrast between the radiance levels of pixels of at least part of the given image and the target spectral signature radiance level.

In some cases, the target spectral signature and the background spectral signature are provided by a user of the color rendering system.

In some cases, the high radiance image is the image with the highest radiance level from the images of the respective image set.

In some cases, the low radiance image is the image with the lowest radiance level from the images of the respective image set.

In accordance with a second aspect of the presently disclosed subject matter, there is provided a color rendering method comprising: obtaining one or more image sets, acquired by one or more imaging systems, wherein: (a) each image set comprising a plurality of images of a scene having an overlapping portion, and (b) each of the plurality of images is associated with a distinct wavelength range, wherein the wavelength range of at least one of the plurality of images within at least one of the one or more image sets is within a non-visible wavelength range; identifying, within each image set: (A) a first image within the respective image set, being: (a) a high radiance image of the respective image set having a radiance level higher than a radiance level of a first percentage of the other images of the respective image set, other than the high radiance image, or (b) a highly differentiating image of the respective image set, having a contrast between a target spectral signature and a background spectral signature higher than a the contrast of a second percentage of the other images of the respective image set, other than the highly differentiating image; (B) a second image within the respective image set, being a low radiance image of the respective image set having a radiance level lower than the radiance level of a third percentage of the other images of the respective image set, other than the low radiance image; and, (C) a third image within the respective image set, being: (a) the low radiance image. (b) another low radiance image of the respective image set having a radiance level lower than the radiance level of a fourth percentage of the other images of the respective image set, other than the low radiance image and other then the another low radiance image, or (c) a mid-range image of the respective image set having a wavelength range that is between a first wavelength range of the first image and a second wavelength range of the second image; and, generating a colored image of the overlapping portion wherein each pixel of the colored image has: (a) a green value associated with the radiance level of a first corresponding pixel of the first image, (b) a blue value associated with the radiance level of a second corresponding pixel of the second image, and (c) a red value associated with the radiance level of a third corresponding pixel of the third image.

In some cases, at least one of the one or more imaging systems is: a multi-spectral imaging system or a hyper-spectral imaging system.

In some cases, the wavelength range of at least one of the plurality images within at least one of the one or more image sets is within a non-visible wavelength range.

In some cases, at least one of the one or more imaging systems is capable of acquiring images in multiple image acquisition channels, and wherein at least one of the plurality of images within each of the one or more image sets is a combination of source images acquired in two or more image acquisition channels.

In some cases, the radiance levels of the source images differ by up to a threshold.

In some cases, the radiance level of at least one of the plurality of images within at least one of the one or more image sets is normalized to be within a given radiance level value range.

In some cases, the radiance level of at least one of the plurality of images within at least one of the one or more image sets is normalized to be within a given sampling-rate value range.

In some cases, the radiance level of a given image within the respective image set is one of: (a) a first average between radiance levels of pixels of at least part of the given image, (b) a second average between radiance levels of pixels within one or more area of interest within the given image, or (c) a contrast between the radiance levels of pixels of at least part of the given image and the target spectral signature radiance level.

In some cases, the target spectral signature and the background spectral signature are provided by a user of the color rendering system.

In some cases, the high radiance image is the image with the highest radiance level from the images of the respective image set.

In some cases, the low radiance image is the image with the lowest radiance level from the images of the respective image set.

In accordance with a third aspect of the presently disclosed subject matter, there is provided a non-transitory computer readable storage medium having computer readable program code embodied therewith, the computer readable program code, executable by at least one processor to perform a color rendering method, the color rendering comprising one or more components, the method comprising: obtaining one or more image sets, acquired by one or more imaging systems, wherein: (a) each image set comprising a plurality of images of a scene having an overlapping portion, and (b) each of the plurality of images is associated with a distinct wavelength range, wherein the wavelength range of at least one of the plurality of images within at least one of the one or more image sets is within a non-visible wavelength range; identifying, within each image set: (A) a first image within the respective image set, being: (a) a high radiance image of the respective image set having a radiance level higher than a radiance level of a first percentage of the other images of the respective image set, other than the high radiance image, or (b) a highly differentiating image of the respective image set, having a contrast between a target spectral signature and a background spectral signature higher than a the contrast of a second percentage of the other images of the respective image set, other than the highly differentiating image; (B) a second image within the respective image set, being a low radiance image of the respective image set having a radiance level lower than the radiance level of a third percentage of the other images of the respective image set, other than the low radiance image; and, (C) a third image within the respective image set, being: (a) the low radiance image, (b) another low radiance image of the respective image set having a radiance level lower than the radiance level of a fourth percentage of the other images of the respective image set, other than the low radiance image and other then the another low radiance image, or (c) a mid-range image of the respective image set having a wavelength range that is between a first wavelength range of the first image and a second wavelength range of the second image; and, generating a colored image of the overlapping portion wherein each pixel of the colored image has: (a) a green value associated with the radiance level of a first corresponding pixel of the first image, (b) a blue value associated with the radiance level of a second corresponding pixel of the second image, and (c) a red value associated with the radiance level of a third corresponding pixel of the third image.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
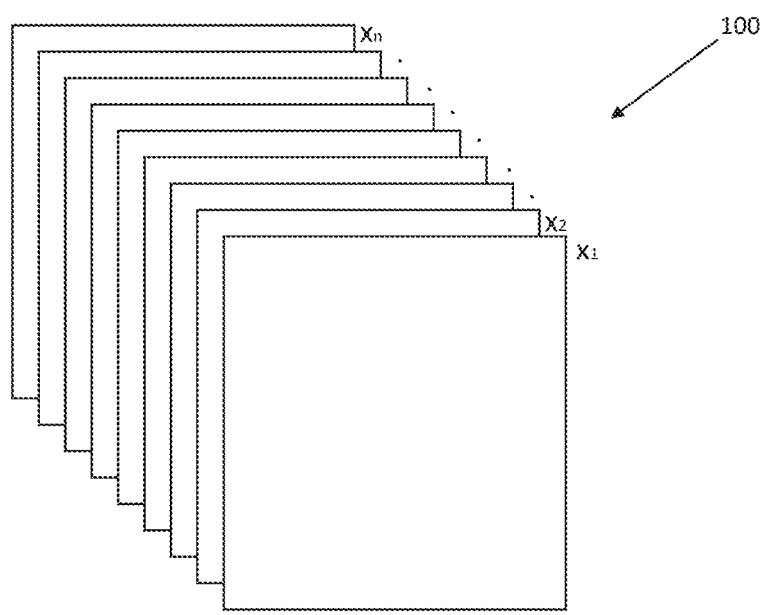
FIG. 1 is a schematic illustration of an image set on which the color rendering system is operating, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "generating", "identifying", "acquiring" or the like, include action and/or processes of a computer that manipulate and/or transform data into other data, said data represented as physical quantities, e.g., such as electronic quantities, and/or said data representing the physical objects. The terms "computer", "processor", "processing resource", "processing circuitry", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 3:
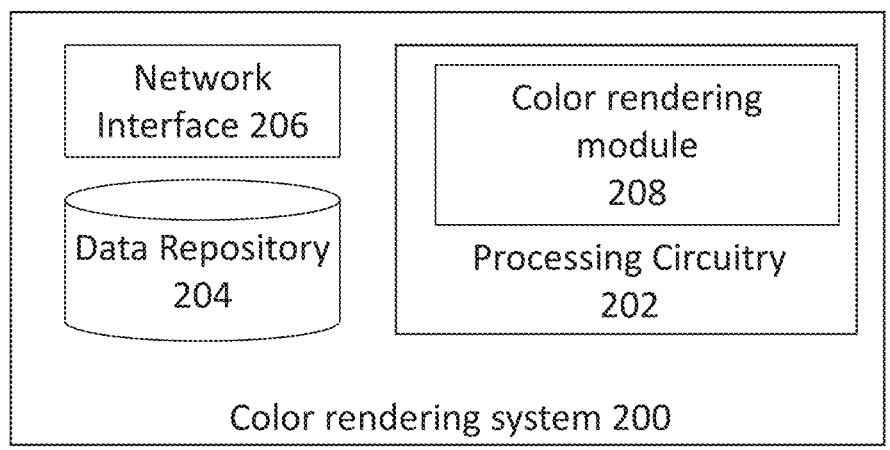
FIG. 3 is a block diagram schematically illustrating one example of a color rendering system, in accordance with the presently disclosed subject matter; and, FIG. 4 is a flowchart illustrating one example of a sequence of operations carried out by a color rendering system, in accordance with the presently disclosed subject matter.

In embodiments of the presently disclosed subject matter, fewer, more and/or different stages than those shown in FIG. 4 may be executed. In embodiments of the presently disclosed subject matter one or more stages illustrated in FIG. 4 may be executed in a different order and/or one or more groups of stages may be executed simultaneously. FIG. 3 illustrates a general schematic of the system architecture in accordance with an embodiment of the presently disclosed subject matter. Each module in FIG. 3 can be made up of any combination of software, hardware and/or firmware that performs the functions as defined and explained herein. The modules in FIG. 3 may be centralized in one location or dispersed over more than one location. In other embodiments of the presently disclosed subject matter, the system may comprise fewer, more, and/or different modules than those shown in FIG. 3.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The presently disclosed subject matter provides a system capable of artificially coloring images acquired from, for example, image acquisition channels, cameras, imaging systems, such as: multispectral image acquisition systems, hyperspectral image acquisition systems, etc., and present them as pseudo-Red, Green, and Blue (RGB) images to a user.

Bearing this in mind, attention is drawn to FIG. 1, showing a schematic illustration of an image set on which the color rendering system (also interchangeably referred to herein as "system") operates, in accordance with the presently disclosed subject matter.

As shown in the schematic illustration, image set 100 includes a plurality of images, denoted $x_1$ to $x_n$, of a scene, all having an overlapping portion. The images can be acquired, for example, by one or more imaging systems, e.g., a multi-spectral imaging system, a hyper-spectral imaging system, an imaging system including a plurality of different imaging devices each having a different wavelength, and the like, capable of acquiring images in multiple image acquisition channels, so as to attain images in different wavelengths or wavelength ranges. In some cases, at least one of the images is in the non-visible spectrum (for example: ultraviolet spectrum, near IR spectrum, Short-Wavelength Infra-Red (SWIR) spectrum, Mid-Wavelength Infra-Red (MWIR) spectrum and Long-Wavelength Infra-Red (LWIR) spectrum). In some cases, two or more of the multiple image acquisition channels of the one or more imaging systems can be combined into a single channel by beaming the two or more channels into one combined channel.

Each of images $x_1$ to $x_n$ is associated, for example, with a distinct wavelength or wavelength range of the visible spectrum (consisting of rays that a typical human eye responds to in wavelengths from about 400 to about 700 nanometers) or of the non-visible spectrum (consisting of rays less than 3900 Å in length, e.g., ultraviolet, roentgen or x, gamma, and cosmic rays, and those exceeding 7700 Å in length, e.g., infrared, high-frequency oscillations used in short- and long-wave diathermy, radio, hertzian, and very long waves) in which the image was taken.

Each image of images $x_1$ to $x_n$ includes a plurality of pixels (not shown) jointly forming the image. The pixels include a radiance level value representing the energy level absorbed by the specific pixel at the distinct wavelength or wavelength range the image was acquired.

In some cases, at least part of images $x_1$ to $x_n$, assembling image set 100, are within the non-visible spectrum, making them invisible to the human eye. As such, any information obtainable within such images is invisible to a human viewer. For example, assuming at least some of images $x_1$ to $x_n$ are directed to capture a scene including a strawberry field and a tomato field in different wavelengths or wavelength ranges of the non-visible light spectrum, a person observing such images would not be able to grasp the presence of the field of strawberries and/or tomatoes as both are not within the visible spectrum (visible to the human eye). To enable the human eye to comprehend the information obtained within such images, and to identify the strawberry field from the tomato field, two or more images of the at least some images $x_1$ to $x_n$ are chosen in order to represent RGB values of a rendered image of the scene. Of the two or more images chosen, at least one image is associated with at least one wavelength or wavelength range of the non-visible spectrum providing at least partial differentiation between a strawberry and a tomato. The two or more images of the at least some images $x_1$ to $x_n$, then enables the artificial coloring of the non-visible spectrum images, such that a strawberry receives a certain color of the visible light (e.g., green), while a tomato receives a different color of the visible light (e.g., blue), as further detailed herein, with reference to FIG. 4.

Figure 2A:
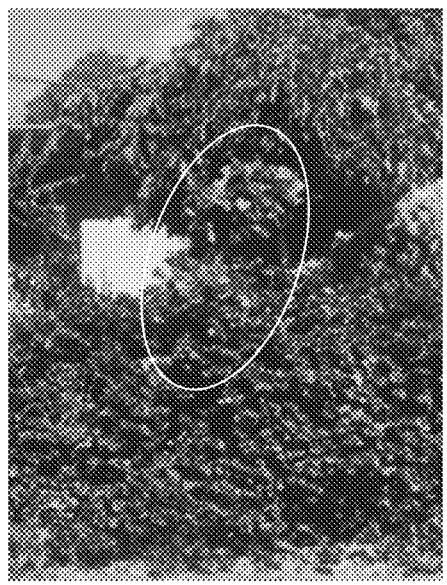
FIGS. 2A-2C are images of a scene illustrating one example of an operation of a color rendering system, in accordance with the presently disclosed subject matter.
Figure 2B:
Figure 2C:

In addition, the scene can include targets, which are elements of interest to a user of the color rendering system, and their backgrounds. By choosing two or more of the images that differentiate between the target and the background to represent RGB values of the rendered image of the scene, a user can differentiate between the target and its background within the observed scene. For example, as best seen in FIGS. 2A-2C, the system is able to differentiate between a plastic tree (marked with a white ellipse), which is the target of the scene, and an actual tree, which is the background of the scene. As can be seen in FIG. 2A, which is a standard VIS (Visible Imaging Spectrometer) imaging picture of the plastic tree incorporated within the actual tree, the two types of trees are practically indistinguishable. FIG. 2B further shows that capturing the same scene of both trees in a wide SWIR (Short-wave Infra-Red) image does not enable differentiating the two types of trees from one another. In contrast, as can be seen in FIG. 2C, which shows a synthetic RGB image from SWIR bands of the same scene, generated by the color rendering system of the presently disclosed subject matter, the plastic tree can be easily differentiated from the actual tree, as each tree type receives a different shade of grey. Attention is now drawn to the components of the color rendering system 200.

FIG. 3 is a block diagram schematically illustrating one example of the color rendering system 200, in accordance with the presently disclosed subject matter.

In accordance with the presently disclosed subject matter, color rendering system 200 (also interchangeably referred to herein as "system 200") can comprise a network interface 206. The network interface 206 (e.g., a network card, a Wi-Fi client, a LiFi client, 3G/4G client, or any other component), enables system 200 to communicate over a network with external systems and handles inbound and outbound communications from such systems. For example, system 200 can receive through network interface 206 one or more image sets from one or more external systems, for example: from an external multi-spectral imaging system, from an external hyper-spectral imaging system, and the like. In addition, system 200 can receive indications of targets and backgrounds found within one or more image sets through network interface 206.

System 200 can further comprise or be otherwise associated with a data repository 204 (e.g., a database, a storage system, a memory including Read Only Memory—ROM, Random Access Memory—RAM, or any other type of memory, etc.) configured to store data, optionally including, inter alia, image sets, images of a scene, overlapping portions, image acquisition channels, wavelength ranges, target spectral signatures, background spectral signatures, etc. Data repository 204 can be further configured to enable retrieval and/or update and/or deletion of the stored data. It is to be noted that in some cases, data repository 204 can be distributed, while the system 200 has access to the information stored thereon. e.g., via a wired or wireless network to which system 200 is able to connect (utilizing its network interface 206).

System 200 further comprises processing circuitry 202. Processing circuitry 202 can be one or more processing units (e.g., central processing units), microprocessors, microcontrollers (e.g., microcontroller units (MCUs)) or any other computing devices or modules, including multiple and/or parallel and/or distributed processing units, which are adapted to independently or cooperatively process data for controlling relevant system 200 resources and for enabling operations related to system's 200 resources.

The processing circuitry 202 comprises a color rendering module 208, configured to perform a color rendering process, as further detailed herein, inter alia with reference to FIG. 4.

Turning to FIG. 4, there is shown a flowchart illustrating one example of a sequence of operations carried out for artificially coloring non-visible spectrum images, in accordance with the presently disclosed subject matter.

Accordingly, the color rendering system can be configured to perform a color rendering process 300, e.g., using color rendering module 208.

For this purpose, the color rendering system 200 obtains one or more image sets 100 acquired by one or more imaging systems capable of acquiring images in multiple image acquisition channels. Each of the one or more image sets 100 includes one or more images of a scene having an overlapping portion. At least some images of the one or more images are associated with a distinct wavelength range that is, for example, within the non-visible spectrum range (block 302). In some cases, the distinct wavelength range can be in the visible spectrum range. In other cases, the distinct wavelength range can be in the non-visible spectrum range, for example, any range found below 400 nanometers or above 700 nanometers (below and above the range associated with the visible spectrum, which is 400 nanometers-700 nanometers).

In a non-limiting example, an image set consisting of ten images, $x_1$ to $x_{10}$, of a scene including a strawberry field (the overlapping portion) is obtained by system 200. Each image of images $x_1$ to $x_{10}$ is associated with a corresponding distinct wavelength range, represented by $\lambda_1$ to $\lambda_{10}$. At least some of the wavelength ranges of distinct wavelength ranges $\lambda_1$ to $\lambda_{10}$ are within the non-visible spectrum. Each image is a matrix of pixels. Each given pixel has a radiance value representative of the corresponding wavelength range radiation emitted from an area of the scene that is associated with the given pixel.

Each image of the one or more images of the one or more image sets 100, is associated with a radiance level. The radiance level of each image within its respective image set 100 can be defined, for example, through an average between radiance levels of pixels of at least part of the image, through an average between radiance levels of pixels within one or more areas of interest within the image, or through a contrast between the radiance levels of pixels of at least part of the image and a target spectral signature radiance level. In our continuing non-limiting example, the radiance level of images $x_1$ to $x_{10}$ is defined as the average between radiance levels of pixels of the strawberry field found in images $x_1$ to $x_{10}$, and is represented by a corresponding radiance level $R_1$ to $R_{10}$.

In some cases, the radiance level of one or more images within the one or more image sets 100 can be normalized, for example, to be within a radiance level value range and/or within a sampling-rate value range. The normalization is made, for example, in order to bring the radiance level of the entire images assembling the image set 100 (each may be associated with a different distinct wavelength or wavelength range and as such with a different range of values) to be in the same range of values. In our continuing non-limiting example, the radiance levels, $R_1$ to $R_{10}$, of images $x_1$ to $x_{10}$ are normalized to be within the values of the Infra-Red (IR) range.

In some cases, one or more images within the one or more image sets 100 can be a combination of source images acquired in two or more image acquisition channels. The combination may involve, for example, source images having radiance levels that differ by up to a threshold.

Once the radiance level of the one or more images of the one or more image sets 100 is defined, system 200, through its color rendering module 208, identifies within each image set 100 a first image, a second image, and a third image (block 304).

The first image can be identified, for example, as the high radiance level image of the respective image set 100 having a radiance level that is higher than the radiance level of a percentage of the remaining images of the respective image set 100, not including the aforementioned high radiance level image (e.g., the image with the highest radiance level of 100% of the remaining images of the respective image set 100). Alternatively, the first image can be identified, for example, as the highly differentiating image of the respective image set, having a contrast between a target spectral signature and a background spectral signature that is higher than the contrast of a percentage of the remaining images of the respective image set 100, not including the aforementioned highly differentiating image (e.g., the image with the highest contrast between a target spectral signature and a background spectral signature of 90% of the remaining images of the respective image set 100). The target spectral signature can be, for example, of an object (e.g., a fruit) within the images, while the background can be, for example, the area of the images that does not include the object (e.g., plants on which the fruit grows). In some cases, the target spectral signature and a background spectral signature can be, for example, provided by a user of the system 200.

The second image can be identified, for example, as the low radiance level image of the respective image set having a radiance level lower than the radiance level of a percentage of the remaining images of the respective image set, not including the aforementioned low radiance level image (e.g., the image with the lowest radiance level of 60% of the remaining images of the respective image set 100).

The third image can be identified, for example, as one of: the same low radiance level image that was previously identified as the second image, a low radiance level image of the respective image set 100, different from the image identified as the second image, having a radiance level lower than the radiance level of a percentage of the remaining images of the respective image set 100 (the image with the lowest radiance level of 70% of the remaining images of the respective image set 100), or a mid-range image of the respective image set 100 having a wavelength range that is, for example, between the wavelength range of the first image (which is, e.g., 800 nanometers-1000 nanometers) and the wavelength range of the second image (which is, e.g., e.g., 200 nanometers-300 nanometers).

In our continuing non-limiting example, the first image is identified to be image $x_3$, as this image possesses the highest radiance level, $\lambda_3$, of all images $x_1$ to $x_{10}$, the second image is identified to be $x_5$, as this image possesses the lowest radiance level, $\lambda_5$, of all images $x_1$ to $x_{10}$, and the third image is identified to be $x_7$, as this image possesses the lowest radiance level of the radiance levels of remaining images $x_1$, $x_2$, $x_4$, $x_6$ and $x_8$ to $x_{10}$.

Once system 200 identifies within each image set 100 a first image, a second image, and a third image, the system 200 generates, from the three identified images, a colored image of the overlapping portion within the image set. Each pixel of the colored image has a green value of between 0 and 255 associated with the radiance level of the corresponding pixel of, for example, the first image, a blue value of between 0 and 255 associated with the radiance level of the corresponding pixel of, for example, the second image, and a red value of between 0 and 255 associated with the radiance level of the corresponding pixel of, for example, the third image (block 306).

In our continuing non-limiting example, system 200 uses images $x_3$, $x_5$, and $x_7$ and generates a colored image of the strawberry field (the overlapping portion) using the corresponding pixels found in these images.

By generating each pixel of the overlapping portion in accordance with each corresponding pixel at the first, second, and third image, as mentioned above, system 200 can create a pseudo-RGB image of the overlapping portion (e.g., a strawberry field) that allows a user to grasp and orientate within the captured scene taken at the non-visible spectrum. In addition, the scene can include targets (continuing the strawberry field example above, the targets are the strawberries' fruit) and their backgrounds (for example, the strawberry plants on which the fruits grow). By generating each pixel of the overlapping portion in accordance with each corresponding pixel at the first, second, and third image, as mentioned above, system 200 can create a pseudo-RGB image of the overlapping portion (e.g., a strawberry field) that allows a user to differentiate between the target and its background within the observed scene.

It is to be noted, with reference to FIG. 4, that some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A color rendering system, the color rendering system comprising a processing circuitry configured to:
   obtain one or more image sets, acquired by one or more imaging systems, wherein: (a) each image set comprising a plurality of images of a scene having an overlapping portion, and (b) each of the plurality of images is associated with a distinct wavelength range, wherein the wavelength range of at least one of the plurality of images within at least one of the one or more image sets is within a non-visible wavelength range;
   identify, within each image set:
   (A) a first image within the respective image set, being: (a) a high radiance image of the respective image set having a radiance level higher than a radiance level of a first percentage of the other images of the respective image set, other than the high radiance image, or (b) a highly differentiating image of the respective image set, having a contrast between a target spectral signature and a background spectral signature higher than a contrast of a second percentage of the other images of the respective image set, other than the highly differentiating image;
   (B) a second image within the respective image set, being a low radiance image of the respective image set having a radiance level lower than the radiance level of a third percentage of the other images of the respective image set, other than the low radiance image; and,
   (C) a third image within the respective image set, being: (a) the low radiance image, (b) another low radiance image of the respective image set having a radiance level lower than the radiance level of a fourth percentage of the other images of the respective image set, other than the low radiance image and other then the another low radiance image, or (c) a mid-range image of the respective image set having a wavelength range that is between a first wavelength range of the first image and a second wavelength range of the second image; and,
   generate a colored image of the overlapping portion wherein each pixel of the colored image has: (a) a green value associated with the radiance level of a first corresponding pixel of the first image, (b) a blue value associated with the radiance level of a second corresponding pixel of the second image, and (c) a red value associated with the radiance level of a third corresponding pixel of the third image.

2. The color rendering system of claim 1, wherein at least one of the one or more imaging systems is: a multi-spectral imaging system or a hyper-spectral imaging system.

3. The color rendering system of claim 1, wherein at least one of the one or more imaging systems is capable of acquiring images in multiple image acquisition channels, and wherein at least one of the images within each of the one or more image sets is a combination of source images acquired in two or more image acquisition channels.

4. The color rendering system of claim 3, wherein the radiance levels of the source images differ by up to a threshold.

5. The color rendering system of claim 1, wherein the radiance level of at least one of the plurality of images within at least one of the one or more image sets is normalized to be within a given radiance level value range.

6. The color rendering system of claim 1, wherein the radiance level of at least one of the plurality of images within at least one of the one or more image sets is normalized to be within a given sampling-rate value range.

7. The color rendering system of claim 1, wherein the radiance level of a given image within the respective image set is one of: (a) a first average between radiance levels of pixels of at least part of the given image, (b) a second average between radiance levels of pixels within one or more area of interest within the given image, or (c) a contrast between the radiance levels of pixels of at least part of the given image and the target spectral signature radiance level.

8. The color rendering system of claim 1, wherein the target spectral signature and the background spectral signature are provided by a user of the color rendering system.

9. The color rendering system of claim 1, wherein the high radiance image is the image with the highest radiance level from the images of the respective image set.

10. The color rendering system of claim 1, wherein the low radiance image is the image with the lowest radiance level from the images of the respective image set.

11. A color rendering method comprising:
    obtaining one or more image sets, acquired by one or more imaging systems, wherein: (a) each image set comprising a plurality of images of a scene having an overlapping portion, and (b) each of the plurality of images is associated with a distinct wavelength range, wherein the wavelength range of at least one of the plurality of images within at least one of the one or more image sets is within a non-visible wavelength range;
    identifying, within each image set:
    (A) a first image within the respective image set, being: (a) a high radiance image of the respective image set having a radiance level higher than a radiance level of a first percentage of the other images of the respective image set, other than the high radiance image, or (b) a highly differentiating image of the respective image set, having a contrast between a target spectral signature and a background spectral signature higher than a contrast of a second percentage of the other images of the respective image set, other than the highly differentiating image;
    (B) a second image within the respective image set, being a low radiance image of the respective image set having a radiance level lower than the radiance level of a third percentage of the other images of the respective image set, other than the low radiance image; and,
    (C) a third image within the respective image set, being: (a) the low radiance image, (b) another low radiance image of the respective image set having a radiance level lower than the radiance level of a fourth percentage of the other images of the respective image set, other than the low radiance image and other then the another low radiance image, or (c) a mid-range image of the respective image set having a wavelength range that is between a first wavelength range of the first image and a second wavelength range of the second image; and, generating a colored image of the overlapping portion wherein each pixel of the colored image has: (a) a green value associated with the radiance level of a first corresponding pixel of the first image, (b) a blue value associated with the radiance level of a second corresponding pixel of the second image, and (c) a red value associated with the radiance level of a third corresponding pixel of the third image.

12. The color rendering method of claim 11, wherein at least one of the one or more imaging systems is: a multi-spectral imaging system or a hyper-spectral imaging system.

13. The color rendering method of claim 11, wherein at least one of the one or more imaging systems is capable of acquiring images in multiple image acquisition channels, and wherein at least one of the images within each of the one or more image sets is a combination of source images acquired in two or more image acquisition channels.

14. The color rendering method of claim 13, wherein the radiance levels of the source images differ by up to a threshold.

15. The color rendering method of claim 11, wherein the radiance level of at least one of the plurality of images within at least one of the one or more image sets is normalized to be within a given radiance level value range.

16. The color rendering method of claim 11, wherein the radiance level of at least one of the plurality of images within at least one of the one or more image sets is normalized to be within a given sampling-rate value range.

17. The color rendering method of claim 11, wherein the radiance level of a given image within the respective image set is one of: (a) a first average between radiance levels of pixels of at least part of the given image, (b) a second average between radiance levels of pixels within one or more area of interest within the given image, or (c) a contrast between the radiance levels of pixels of at least part of the given image and the target spectral signature radiance level.

18. The color rendering method of claim 11, wherein the high radiance image is the image with the highest radiance level from the images of the respective image set.

19. The color rendering method of claim 11, wherein the low radiance image is the image with the lowest radiance level from the images of the respective image set.

20. A non-transitory computer readable storage medium having computer readable program code embodied therewith, the computer readable program code, executable by at least one processor to perform a color rendering method, the color rendering comprising one or more components, the method comprising:

obtaining one or more image sets, acquired by one or more imaging systems, wherein: (a) each image set comprising a plurality of images of a scene having an overlapping portion, and (b) each of the plurality of images is associated with a distinct wavelength range, wherein the wavelength range of at least one of the plurality of images within at least one of the one or more image sets is within a non-visible wavelength range;

identifying, within each image set:
(A) a first image within the respective image set, being: (a) a high radiance image of the respective image set having a radiance level higher than a radiance level of a first percentage of the other images of the respective image set, other than the high radiance image, or (b) a highly differentiating image of the respective image set, having a contrast between a target spectral signature and a background spectral signature higher than a contrast of a second percentage of the other images of the respective image set, other than the highly differentiating image;
(B) a second image within the respective image set, being a low radiance image of the respective image set having a radiance level lower than the radiance level of a third percentage of the other images of the respective image set, other than the low radiance image; and,
(C) a third image within the respective image set, being: (a) the low radiance image, (b) another low radiance image of the respective image set having a radiance level lower than the radiance level of a fourth percentage of the other images of the respective image set, other than the low radiance image and other then the another low radiance image, or (c) a mid-range image of the respective image set having a wavelength range that is between a first wavelength range of the first image and a second wavelength range of the second image; and, generating a colored image of the overlapping portion wherein each pixel of the colored image has: (a) a green value associated with the radiance level of a first corresponding pixel of the first image, (b) a blue value associated with the radiance level of a second corresponding pixel of the second image, and (c) a red value associated with the radiance level of a third corresponding pixel of the third image.

* * * * *